US006817537B2

(12) United States Patent
Watanabe et al.

(10) Patent No.: US 6,817,537 B2
(45) Date of Patent: Nov. 16, 2004

(54) TIME CARD AND TIME RECORDER SYSTEM USING TIME CARD

(75) Inventors: Hirosada Watanabe, Yokohama (JP); Mitsuru Saito, Yokohama (JP); Masayuki Mochizuki, Yokohama (JP); Hiroaki Yamagishi, Yokohama (JP); Yuichi Ishizuka, Yokohama (JP)

(73) Assignee: Amano Corporation, Yokohama (JP)

( * ) Notice: Subject to any disclaimer, the term of this patent is extended or adjusted under 35 U.S.C. 154(b) by 86 days.

(21) Appl. No.: 10/101,349

(22) Filed: Mar. 20, 2002

(65) Prior Publication Data

US 2003/0178497 A1 Sep. 25, 2003

(51) Int. Cl.$^{7}$ .................................................. G06K 19/06
(52) U.S. Cl. ......................................... 235/494; 235/377
(58) Field of Search .............................. 235/494, 60.38, 235/377; 346/82

(56) References Cited

U.S. PATENT DOCUMENTS 4,011,434 A * 3/1977 Hockler ...................... 235/377
4,804,829 A * 2/1989 Jacobsen .................... 235/377
5,767,868 A * 6/1998 Sugiuchi et al. .............. 346/82
5,990,915 A * 11/1999 Tenenbaum et al. .......... 346/82
6,061,303 A * 5/2000 Gauthier et al. .............. 368/10

FOREIGN PATENT DOCUMENTS

JP 08101935 4/1996

* cited by examiner

*Primary Examiner*—Thien M. Le
*Assistant Examiner*—Lisa M. Caputo
(74) *Attorney, Agent, or Firm*—Stevens, Davis, Miller & Mosher, LLP

(57) ABSTRACT

A time card may have first and second card identifying sections disposed on opposite faces of the time card. The first card identifying section stores a most significant value of an identification of the time card, and the second card identifying section stores a least significant value of the card's identification. When combined to form a single value, the most and least significant values provide the time card identification. Also, a printing position indicator on the card identifies an initial printing position for the first and second card identifying sections to a time card recorder.

9 Claims, 16 Drawing Sheets

FIG. 10

REFERENCE STEP NUMBER

| | |
|---|---|
| 1 MARK | 7 STEPS |
| 2 MARKS | 21 STEPS |
| 3 MARKS | 36 STEPS |
| 4 MARKS | 50 STEPS |
| 5 MARKS | 64 STEPS |
| 6 MARKS | 79 STEPS |
| 7 MARKS | 93 STEPS |
| 8 MARKS | 107 STEPS |
| 9 MARKS | 121 STEPS |
| 10 MARKS | 136 STEPS |
| 11 MARKS | 150 STEPS |
| 12 MARKS | 164 STEPS |
| 13 MARKS | 179 STEPS |

TIME CARD AND TIME RECORDER SYSTEM USING TIME CARD

BACKGROUND OF THE INVENTION

The present invention relates generally to a time card and a time recorder system, and more particularly to a time card and a time recorder system for reading an ID from the time card, storing working information read from the time card in a memory corresponding to the ID, and printing the working information to the time card.

PRIOR ART

In a time recorder system, a time recorder generally stores working data in the form of attendance and leaving data and information, and prints the attendance and leaving information to a time card based on an ID read from the time card.

As is shown in FIG. 17, a prior art time card TC is provided with printing position reference marks 50A, 50B and 50C, card identifying codes 51 and 52, and marks 51H and 52H arranged along a card inserting direction of the recorder and in a side edge of the time recorder. In accordance with the prior art time recorder system, a mark detecting sensor of the time recorder reads. the ones-unit digit number from the mark 51H, after reading the reference mark 50A, and then reads the tens-unit digit number from the mark 52H after reading the reference mark 50B. The time recorder recognizes as a card identifying code (ID code) the combination of the ones-unit digit and tens-unit digit number. Thereafter, the attendance and leaving information are stored in the memory and are printed on the time card.

In the prior art time recorder system however, each of the column codes 51H and 52H of the time card TC are arranged along a lengthwise direction of the time card. In order to read, in turn, the information of columns 51H and 52H, the time card TC must be inserted in to the time recorder toward the lengthwise direction of the time card. Thereby, a long time interval for one printing operation is required to print out the information. Also, the size of the time recorder has to be large in the lengthwise direction to accommodate the time card and the plotting time is long.

In short, in the above mentioned prior art time recorder system, there is the drawback that the printing time interval is long. Also, a housing of the time recorder TC must be manufactured to house a time card, because the time card is inserted in the lengthwise direction. The various kinds of codes 51H and 52H and the like are read during the forward direction movement of the card, the attendance or leaving data are printed once the card feeding is stopped, and the time card TC is fed back toward the entry of the time recorder.

Moreover, a significant drawback of the prior art time recorder systems is that the time recorder system can only combine the ones-unit digit number code and the tens-unit digit code at most. Therefore, the available number of personnel time cards is limited to ninety-nine.

It is, accordingly, an object of the present invention to provide a time card that can employ a large number of ID codes. It is another object of the invention to provide a time recorder system which makes the processing speed fast and uses a small sized time recorder. It is a further object of the invention to provide a time recorder that reads and prints during movement of the time card toward an inserting direction.

SUMMARY OF THE INVENTION

To achieve the above described objects, according to the present invention, a time card includes an ID for identifying a card and a printing column for printing working data. The time card comprises a dividing means for dividing the ID into at least two portions, a positioning means for positioning the divided ID parallel to both the front and rear faces of the time card or both the right and left side edges of the time card.

Therefore, a number of ID codes can be fabricated by dividing one ID code, by arranging the divided ID codes, and by positioning the divided ID code parallel to both the front and rear faces of the time card or both the right and left side edges of the time card.

The ID mark divided into at least two portions and positioned parallel to both the front and rear faces of the time card or the right and left side edges comprises a most significant digit numeric value and a least significant digit numeric value, or a character sign. The ID is identified by combining the most significant digit and the least significant digit.

Accordingly, it is possible for a number of persons to use one time recorder, by dividing a code number such as "3412" into "34" and "12" and arranging the divided code numbers on the front and rear faces or right and left sides, respectively.

Further, the divided ID mark may comprise a binary number. Therefore, it is possible for a number of persons to use one time recorder by dividing the ID into a number of ID codes and by combining the divided ID codes.

Front and rear face reading marks of the card are arranged at a near side of a lower end of the time card. One of the divided ID marks, having the binary number, is arranged at an upper position of the card front face and rear face reading marks. A printing column position reference mark corresponds to an employee number, a sixteenth column, and fifteenth column and the like.

Accordingly, the printing precision is improved in a card printing row, where the function for guiding does not fully perform with respect to the inserted time card. This is accomplished by arranging the card face deciding marks, for dividing the front face or the rear face, and by arranging a plurality of printing column position reference marks in the upper side thereof.

The card front face and rear face reading marks of the divided ID marks are arranged on the time card such that the respective card front face and rear face reading marks are located in a closed condition, without a gap. Therefore, it is possible to make the reading time duration preferably short.

The ID mark on the time card comprises a printed or recorded bar code that is arranged along a card inserting direction. Accordingly, providing redundant space on the time card is unnecessary, and more space is available. The divided ID is printed or recorded at the side edge portion of the time card, where the printing column is not printed. Thereby, more time card space is available. Reading of the ID can be correctly performed by means of formatting the reading means of each ID mark with the binary number.

A time recorder system in accordance with the present invention includes an identifying means for confirming an ID recorded on a time card; a recording means for storing working information, such as a current time and the like to a memory corresponding to the ID; and printing means for printing the ID to a printing column of the time card. The time recorder system also comprises a reading means for reading an ID, divided into at least two portions and arranged serially at a front face and a rear face of the time card, and an ID reading means for reading the divided ID as one ID, by combining the divided ID read such that the divided ID are read by the font face and rear face reading means. Therefore, the reading of the ID can be carried out within a short time interval and the size of the time card is miniaturized, since one ID is divided into a plurality of ID codes and the plural ID codes are interpreted by their combination.

According to the present invention, in a time recorder system including an identifying means for confirming an ID recorded on a time card, a recording means for storing a working information, such as a current time and the like to a memory corresponding to the ID, and printing means for printing the ID to a printing column of the time card, the time recorder system comprises two reading means for reading an ID divided into at least two portions and arranged serially at one side of the time card. An ID reading means interprets the divided ID as one ID by combining the divided ID read by the two reading means. Therefore, the reading of the ID can be carried out within a short time interval and the size of the time recorder is miniaturized, since one ID is divided into a plurality of ID codes and the plural ID codes are interpreted by combining them.

A time recorder system may further comprise a means for reading the front face and rear face deciding mark, one ID mark and a printing column control mark, by means of one reading means out of the front face reading means and the rear face reading means. A reading means for reading the other divided ID mark, divided by the other reading means, is arranged on the other side edge portion by the other reading means, such that the reading by the one reading means is executed simultaneously with the other reading means.

Accordingly, it is possible to read accurately during the deciding operation, the feed timing of the time card and the read timing, by means of reading the card front and rear face marks, a printing column control mark, and the one divided ID mark. Also, the reading time interval for combining the divided IDs is made short, since the reading of the each mark is executed simultaneously by the one reading means and the other reading means.

Reading of the ID divided mark and printing of the working information by the reading means are performed in the course of the time card's insertion movement.

It is possible to read the divided ID codes within a short time interval and to print the working data, such as the current time and the like, to the printing column in the course of inserting the time card in addition to reading the ID codes. Accordingly, it is possible to provide a time recorder system which speeds up the processing operation by shortening the time interval required for one printing operation, in comparison with the prior art time recorder system.

BRIEF DESCRIPTION OF THE DRAWINGS

With reference to the appended drawings, below follows a description of preferred embodiments of the present invention cited as examples.

FIG. 10 is a view showing a mark criterion table illustrating a relation between the card feeding step number and the mark position;

DETAIL DESCRIPTION OF THE EMBODIMENT

Figure 1:
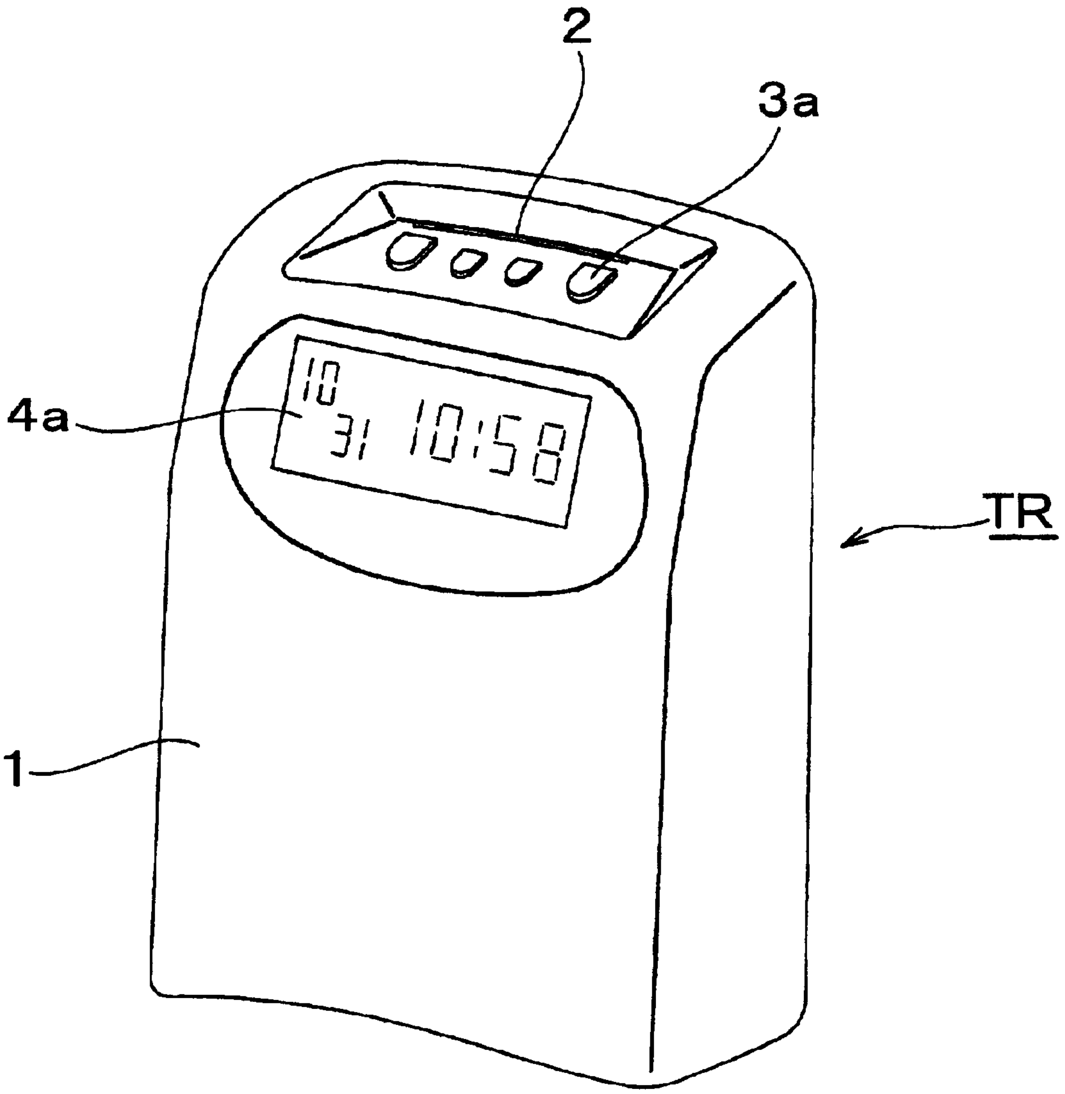
FIG. 1 is a sketch diagram showing an example of a time recorder employed in a time recorder system.

Referring to the drawings, FIG. 1 is a sketch diagram of an exemplary time recorder TR constituting a time recorder system in accordance with the present invention. In FIG. 1, reference numeral 1 identifies a housing of the time recorder TR, reference numeral 2 identifies an entry of the time recorder TR for inserting a time card (hereinafter described), reference numeral 3*a* identifies an instruction switch of an input device, which selects a printing column when printing the working data such as attendance time data, leaving data and the like on the time card. Instruction switch 3*a* is used when inputting the card registration and an employee number. Reference numeral 4*a* identifies a display window of an indicator which displays the current time, an ID, an error and the like.

Figure 2:
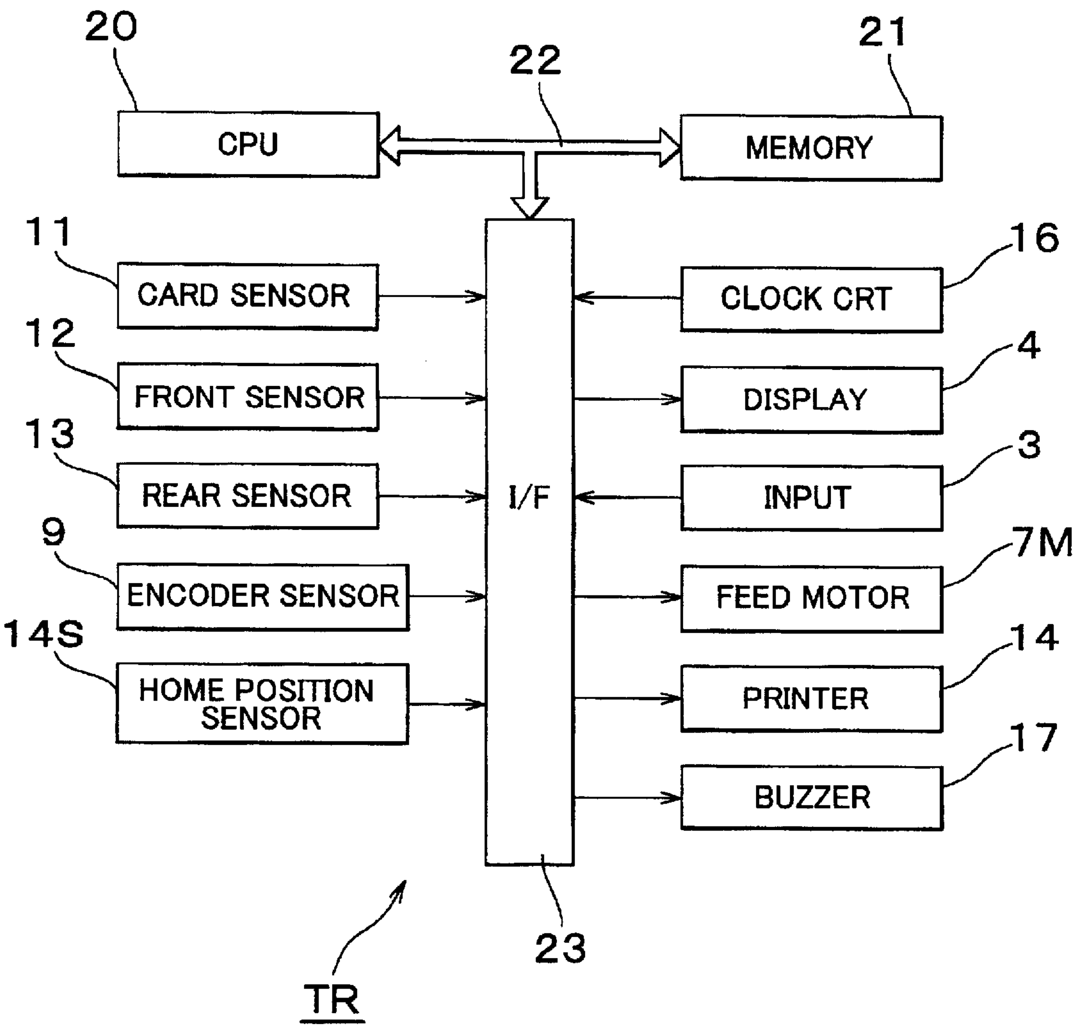
FIG. 2 is a block diagram showing an electrical constitution of the time recorder shown in FIG. 1.

FIG. 2 is a block diagram illustrating an electrical constitution of the time recorder. As is shown in FIG. 2, the time recorder TR includes a control unit which comprises a CPU 20; a memory 21 for storing various kinds of system programs and data files regarding employment data of each employee; an interface 23 connected between the CPU 20 and the memory 21 across a bus 22; an input device 3; an indicator 4 for displaying a current time, an ID, and an error mode; a card feeding motor 7M for feeding a time card; an encoder 9 detecting feeding stroke data of the time card; a card sensor 11 for detecting the time card fed from the entry 2 of the time recorder TR, a front face mark sensor 12 for detecting marks (hereinafter described) provided in the time card; a rear face mark sensor 13 for detecting the marks provided on a rear face of the time card; and a home position sensor 14S for detecting a home position of a printer head.

Further, the control unit comprises a printer 14 in the form of a dot printer, a time clock circuit 16 for supplying a standard time, and an alarm 17 for alerting a user of ane error and the like. Electrically connected to the interface 23 are a card feeding motor 7M, an encoder sensor 9, a card detecting sensor 11, mark detecting means including a front face mark sensor 12 and a rear face mark sensor 13, a printer 14, a printer head home position sensor 14S, an input device 3, and an indicator 4. Further, a time clock circuit 16, used as a standard clock of the time recorder TR, and a buzzer 17 are electrically connected to the interface 23. These are controlled by the program stored in the memory 21.

Figure 3:
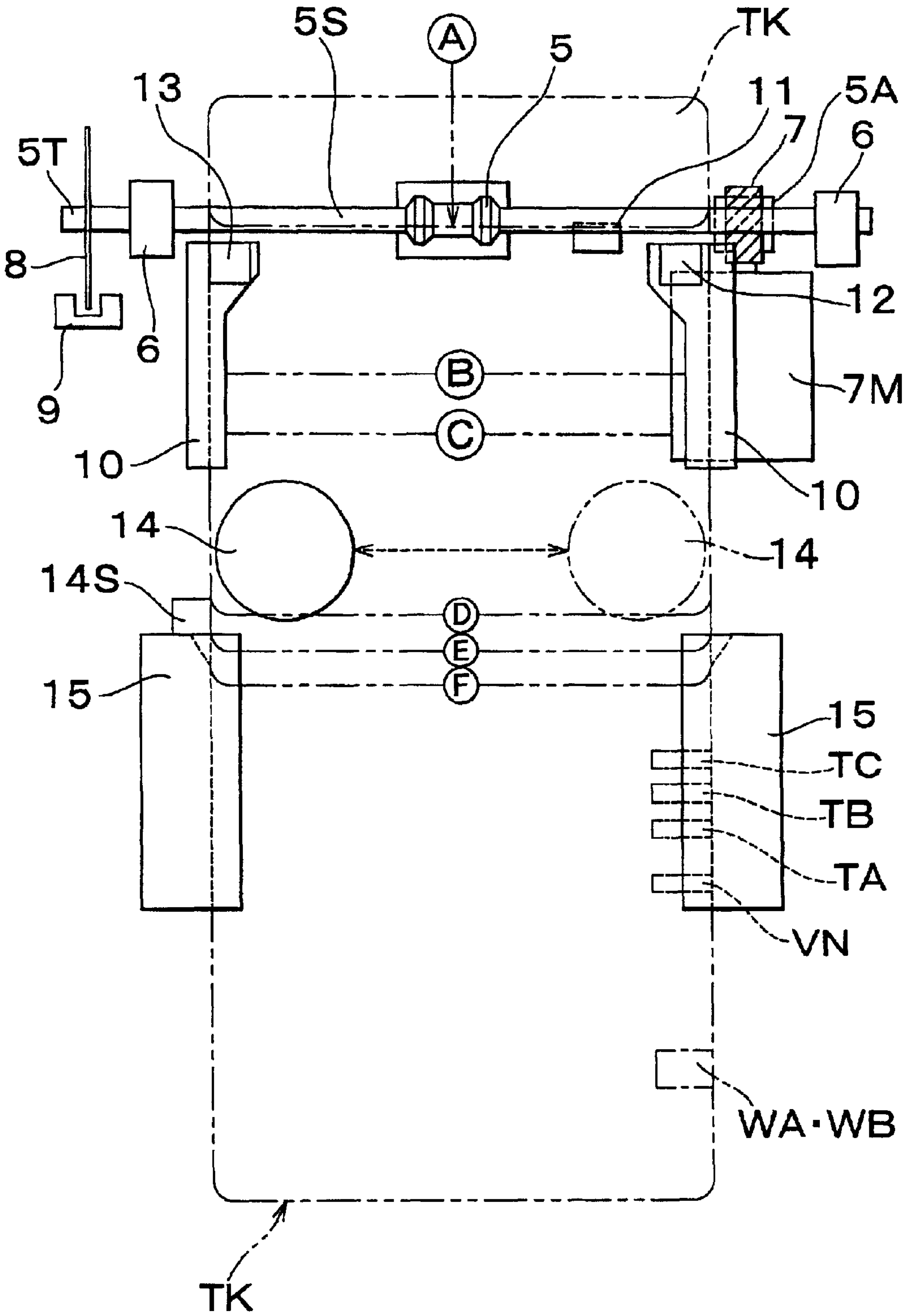
FIG. 3 is a block diagram showing an internal constitution of a time recorder shown in FIG. 1.

FIG. 3 is a block diagram illustrating an internal constitution of the time recorder TR. The time recorder TR includes bearings 6 and 6, each of which is respectively mounted on a side edge portion; a rotation shaft 5S erected rotatably to the bearings 6 and 6; a feed roller 5 mounted on the rotation shaft 5S; a wormgear 5A which is mounted on a rotation shaft of the card feeding motor 7M and engages with the wormgear 5A; a disc 8 which is fixed to the other end portion of the rotation shaft 5S to form an encoder together with the encoder sensor 9. The encoder sensor 9 detects the feed per revolution of the rotation shaft 5S to feed the time card TK fed by the card feeding roller 5.

The time card further includes a first guiding member in the form of upper guides 10 and 10, which guide both side edge portions of the time card TK fed from the entry 2. A second guiding member in the form of lower guides 15 and 15, guide both side edge potions of the time card TK. As seen in FIG. 3, the time recorder TR is also equipped with the card feeding motor 7M, the front face mark sensor 12, the rear face mark sensor 13, the printer 14 and the home position sensor 14S and the like. The card feeding motor 7M rotates and feeds the time card TK when a card detecting sensor 11 detects a top end portion of the time card TK inserted into the entry 2.

Each of mark sensors 12 and 13 are provided to the identical positions (for example upper end position of the upper guides) of the time card TK such that each mark sensor simultaneously detects each mark respectively written on the top and back surfaces of the time card TK.

Reference characters A, B, C, D, F and F illustrate the relationship of the position of the time card TK between the lower end portion of the time card TK and the lower guides 15 and 15 illustrated in FIGS. 8 and 9, which show the traveling states (described hereinafter) of the time card TK. In accordance with the present invention, the ID code recorded on the time card TK is read and a printing process is executed with respect to the time card TK.

Figure 4:
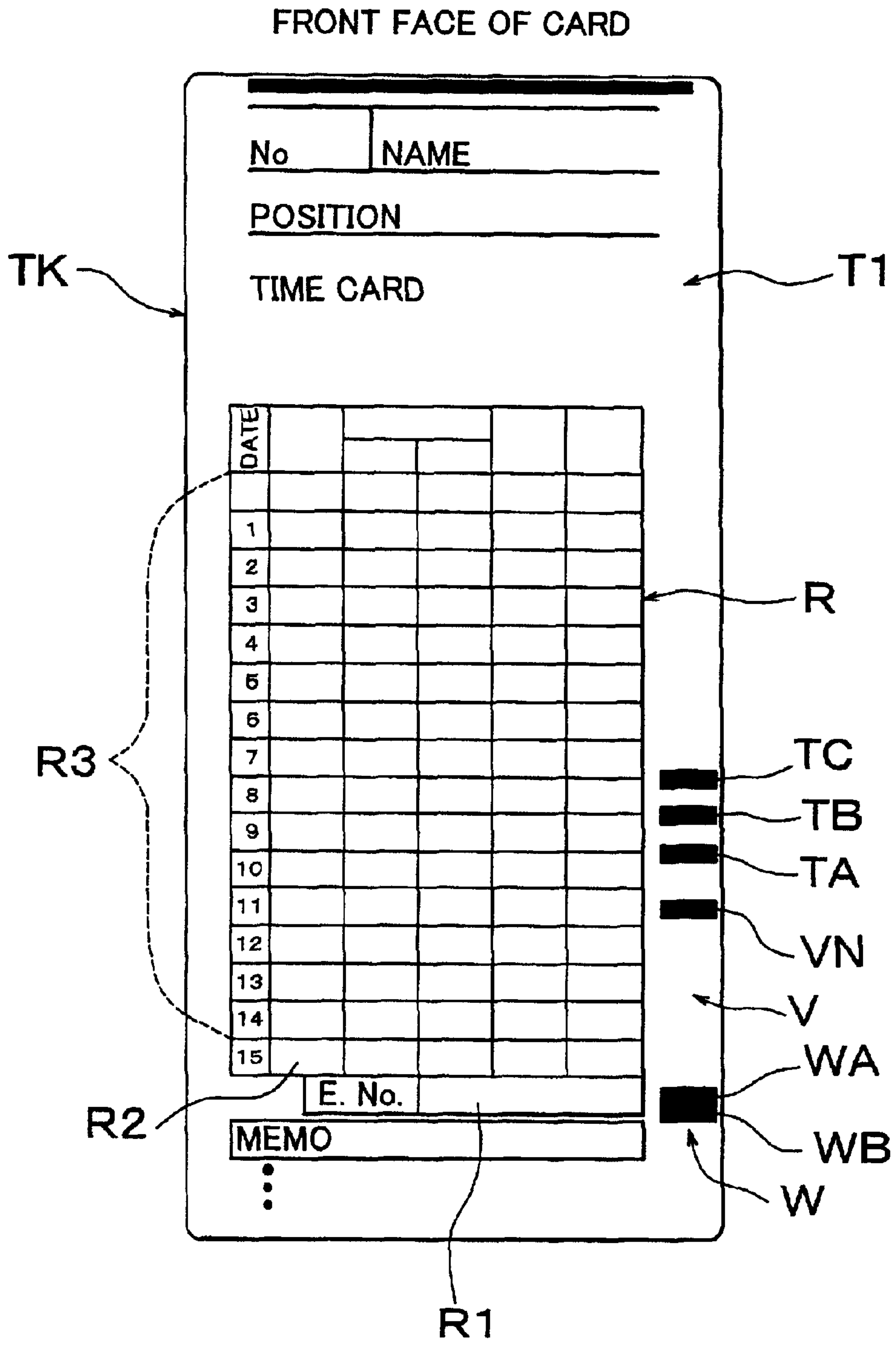
FIG. 4 a front face view showing an example of a time card according to the present invention.

FIG. 4 is a front face view showing an example of the time card TK according to the present invention. As is shown in FIG. 4, a total of sixteen printing columns R and an employee number print column R1 are previously printed, in turn, toward an upper position in a front face T1 of the time card TK having a name recording column and a position recording column. An uppermost column of the data printing rows R3 is a column to be blank.

In accordance with the present invention, the time card TK comprises a card face detecting means for identifying a direction of the time card TK to be printed, an ID mark indicating means for indicating an ID to be printed, and a printing position deciding means for identifying a printing position.

In the embodiment of the invention, the card face deciding means includes a card face deciding column W having a front face deciding mark WA, which indicates the front face T1 of the time card TK. The ID mark indicating means comprises an ID mark indication column V that includes a most significant digit mark VN, which decides a most significant digit to be printed on the time card TK, and a least significant digit mark VN' which decides a least significant digit to be printed. The print position deciding means comprises an ID mark indicating column including a first printing column position reference mark TA that identifies an employee number printing column R1, a second printing column position reference code mark TB that defines a work data printing column R, and a third printing position reference code mark TC that decides a printing column R3 of a group of data printing rows.

A card face deciding column W and an ID mark indication column V are provided at one side edge portion of the time card TK in series with each other. Accordingly, the front face deciding mark WA, the rear face deciding mark WB and the most significant digit mark VN are serially arranged to the side edge portion of the time card toward an upward direction of the time card. The first printing column position reference mark TA, the second printing column position reference mark TB and the third printing column position reference mark TC are arranged serially at the upper side of the front face deciding mark WA and the rear face deciding mark WB in series with the front face deciding mark WA and the rear face deciding mark WB.

The first print column position reference mark TA is used as a reference mark in printing the employee number. The second printing column position reference mark TB is used as a reference mark in recording the working data in regularly printing, at a lowermost column of the work data printing column R. The third printing column position reference mark TC is used as a reference mark in printing the working data. Each of the marks TA, TB, TC and VN are aligned serially along the inserting direction of the time card TK and at a position to be read by the front mark sensor 12.

Figure 5:
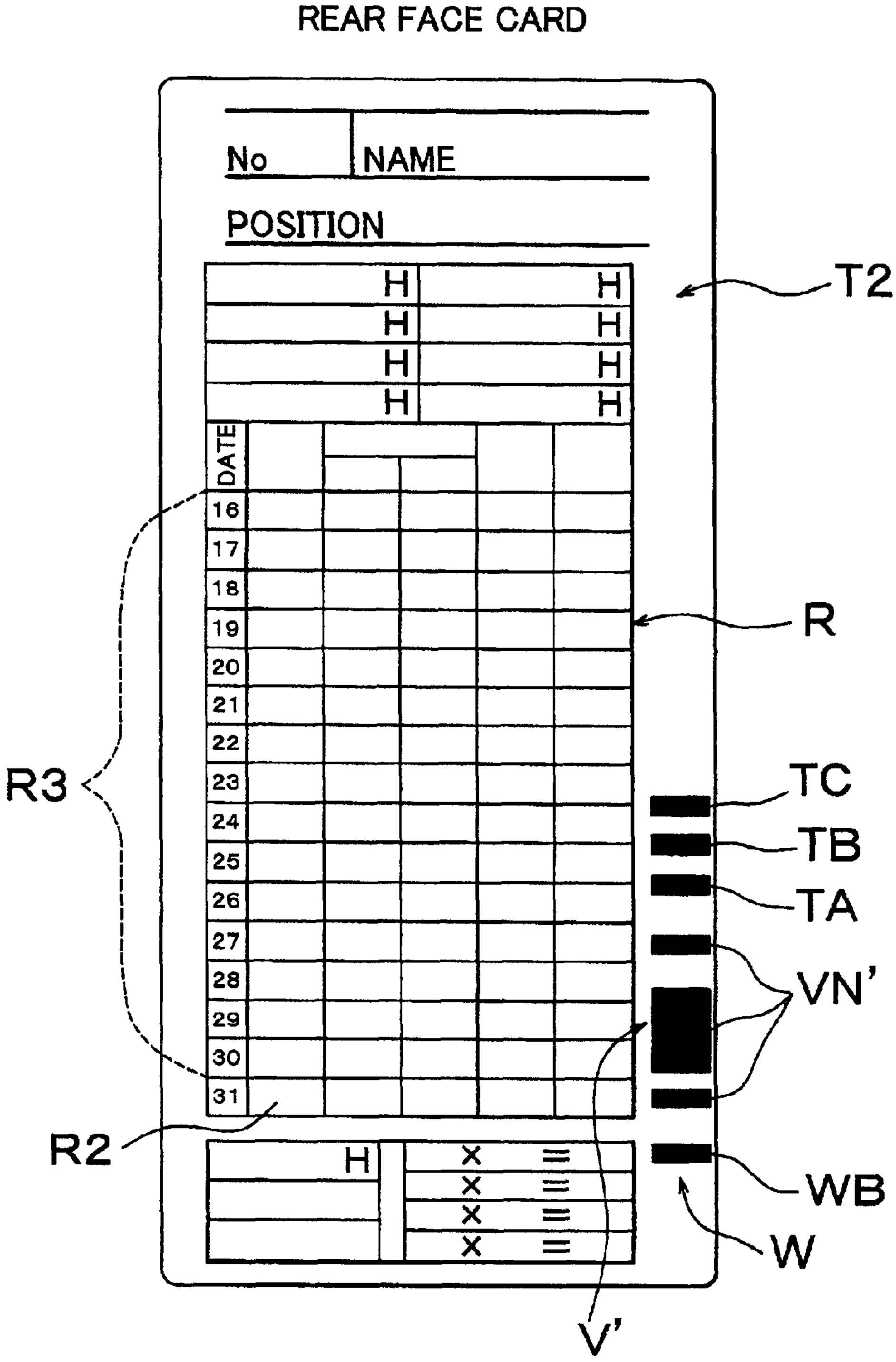
FIG. 5 is a rear face view of the time card shown in FIG. 4.

FIG. 5 is a rear face view showing an example of the time card TK according to the present invention. In a rear face T2 of the time card TK, similarly to the front face T1 shown in FIG. 5, a total of sixteen printing columns R and the employee number printing column R1 are previously printed, in turn, toward an upper position of the rear face T2 of the time card TK having a name recording column and a position recording column and the like. A lowermost column of the data printing rows R3 is a column to be blank.

A card face deciding column W and an ID mark indication column V' are provided in one side edge portion of the time card TK in series with each other. Accordingly, the rear face deciding mark WB and the least significant digit mark VN' are serially arranged in the side edge portion of the time card TK toward the upward direction of the time card. The first printing column position reference mark TA, the second printing column position reference mark TB and the third printing column position reference mark TC are provided at the upper side of the front face deciding mark WA and the rear face deciding mark WB, in series with the rear face deciding mark WB and the least significant digit mark VN'.

Figure 6:
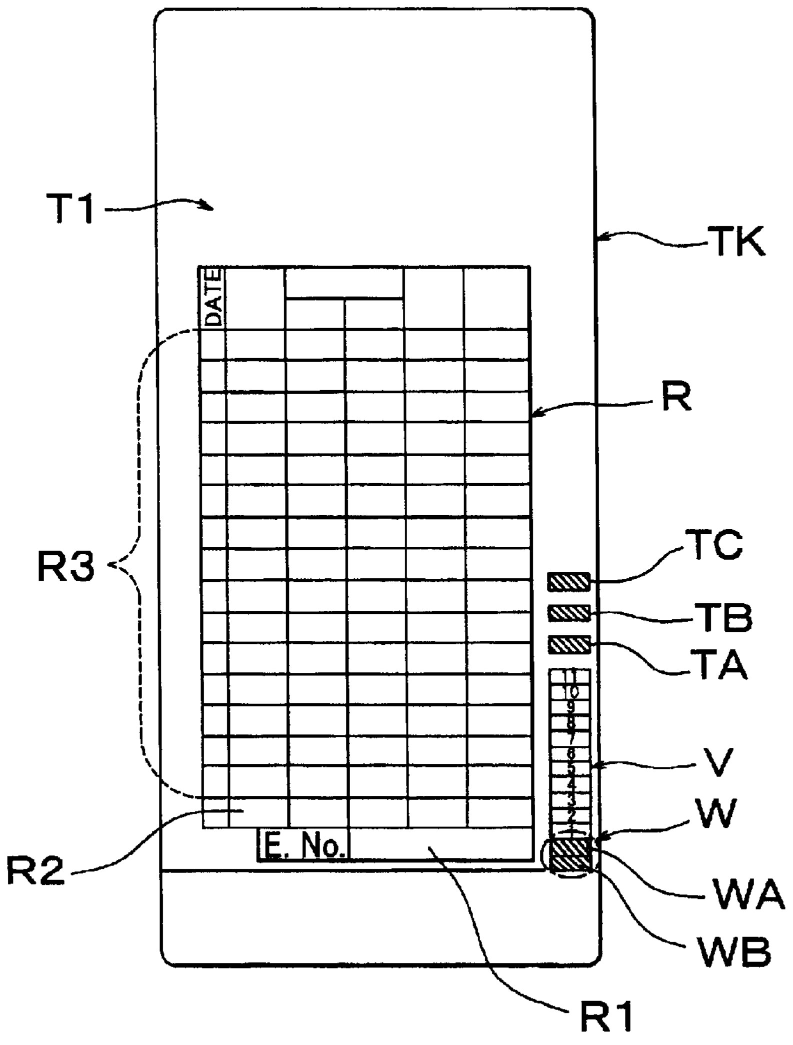
FIG. 6 is a block diagram of the time card shown in FIG. 5.
Figure 7:
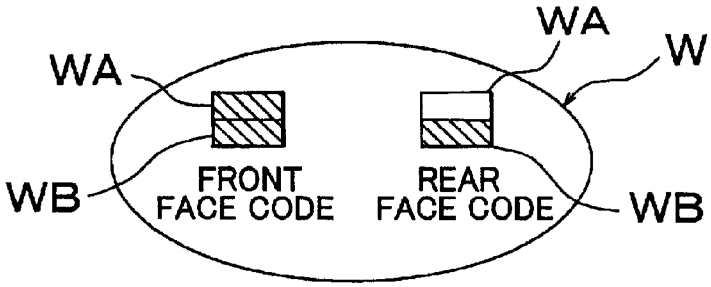
FIG. 7 is an enlarged view of front face and rear face deciding marks of the time card according to the present invention.

As seen in FIGS. 6 and 7, each of the card face deciding columns W is provided with the front face deciding mark WA and the rear face deciding mark WB. The front face detecting sensor 12 detects the front face T1 when both of the marks WA and WB are black. On the other hand, the rear face detecting sensor 13 detects the rear face T2 when only one of the marks WA and WB is black. However, the present invention is not limited to these deciding methods.

According to the present invention, the most significant digit mark VN, corresponding to an upper card column of an employee ID, is recorded to the front face T1 at an ID mark indicating column V. A least significant digit mark VN', corresponding to an lower card column of an employee ID, is recorded to an ID mark indicating mark V' of the rear face T2. The sensors read the complete ID by means of combining the partial ID provided at the front face with the partial ID provided at the rear face T2.

Additionally, when recording the divided ID, the most and least significant digit marks VN and VN' of a side-face (such as front face T1), may be provided at the left side of the time card shown in FIG. 4. As is shown in FIG. 5, the ID mark indication column VN' may be provided at the right side and the mark sensors for reading the marks at the right and left side of the time card may be provided at the right and left sides of the card entering path.

Further, as is shown in FIG. 6, the ID mark indication columns V and V' are equipped with eleven indication columns. The eleventh indication column is a column for parity. Therefore, the time card is equipped with a total of twenty indication columns. When creating an ID code of "3412" for example, "3412" may be divided into "34" and "12." Thereby, an ID mark indication V of "34" may be recorded at the ten indication columns of card face T1 and "12" can be recorded at the ten indication columns of card face T2. Accordingly, the ID code of "3412" can be created by combining the most significant digit mark VN corresponding to "34" and the least significant digit mark VN' corresponding to "12."

Figure 11:
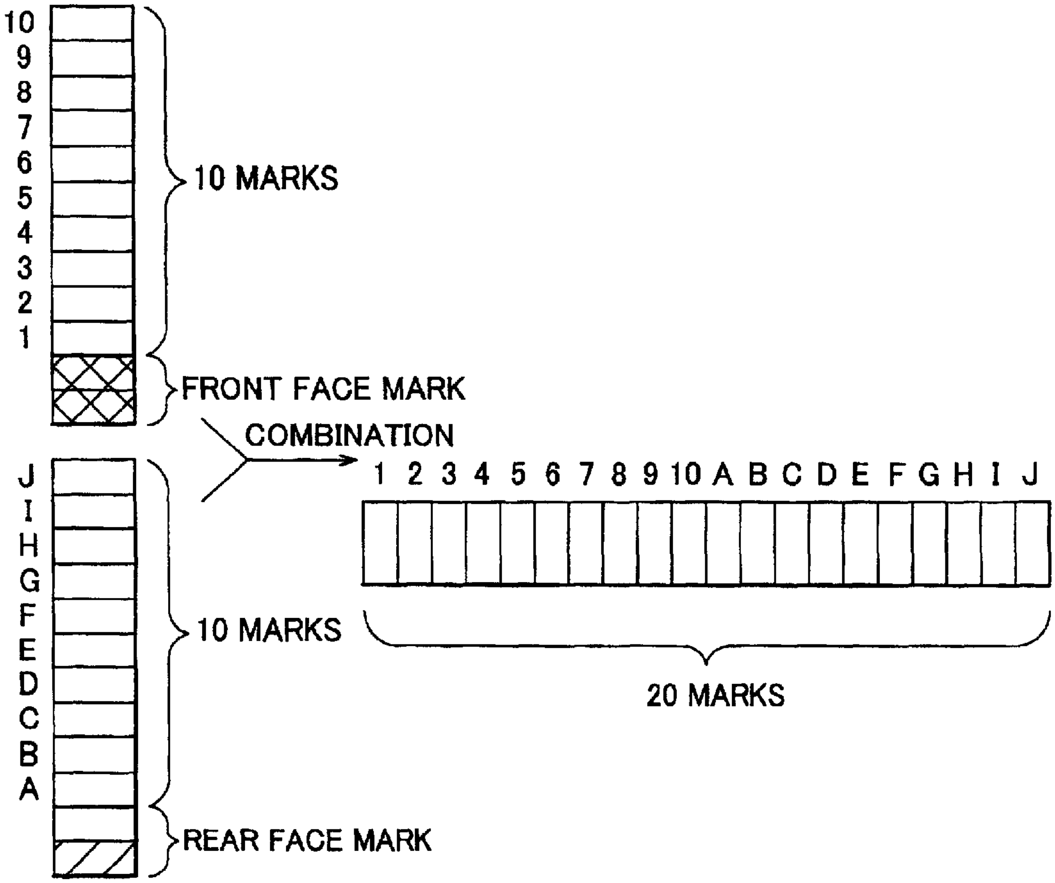
FIG 11 is a view showing the combination of divided ID marks.

As is shown in FIG. 11, it is possible to create another constitution of the ID code by making the ID mark indicating column V of the front face T1 the numbers 1–10 and by making the ID mark indicating column V' of the front face T1 letters or signs.

As described in the foregoing, the most significant digit mark VN and the least significant digit mark VN' are recorded to each of the ID mark indicating columns V and V' by a binary number and each of the most significant digit mark VN and the least significant digit mark VN' is printed without a gap between the respective front and back portions of marks VN, VN', WA and WB. The first, second and third printing column position reference marks TA, TB and TC are respectively formed by a bar code shape. Accordingly, the reading by the mark sensors 12 and 13 can be performed in a short time interval and accurately.

Figures 8A, 8B, 8C:
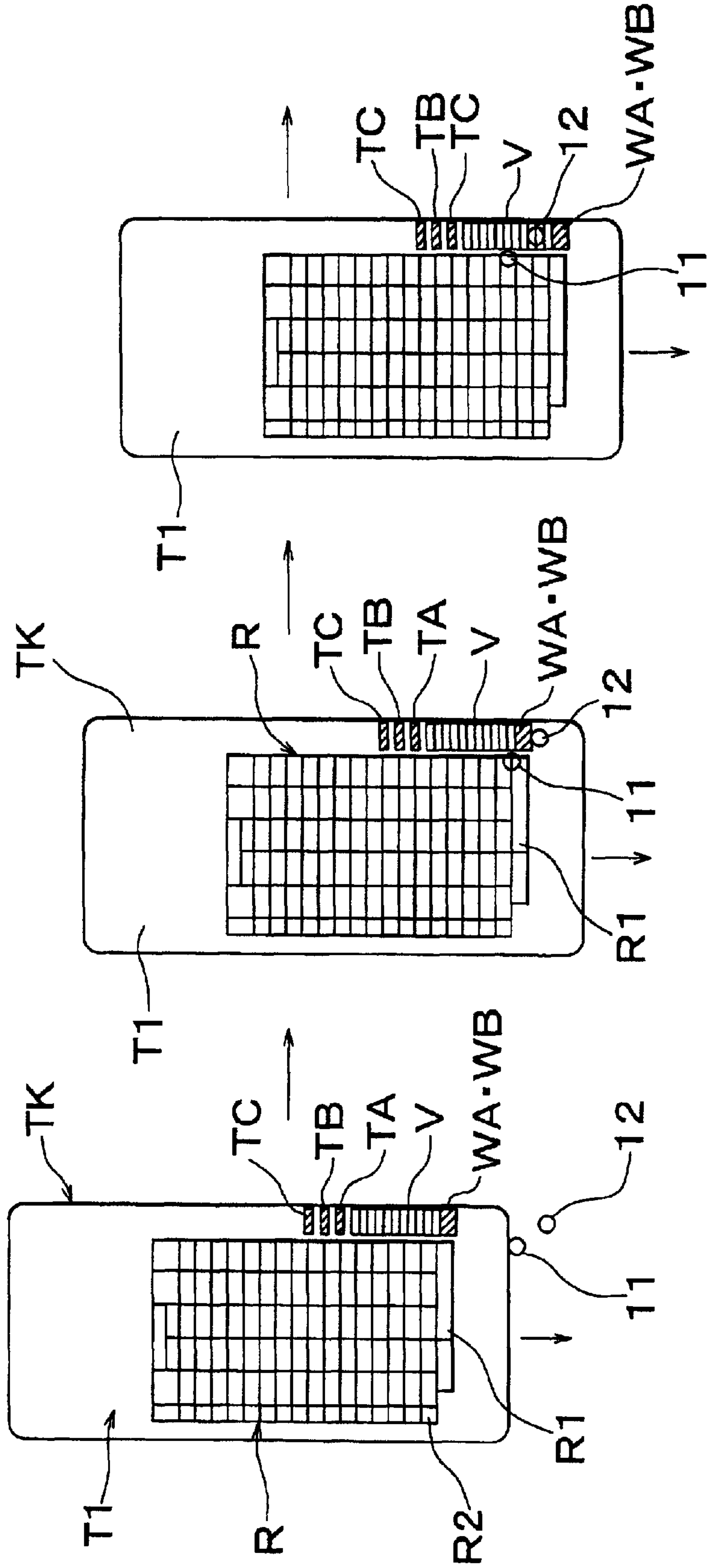
FIGS. 8A through 8C are views illustrating a card inserting operation of the time recorder system according to the present invention.

FIGS. 8A through 8C and FIGS. 9A through 9C show a processing operation of the time recorder from the insertion of the time card to the printing operation of the time recorder. As seen in FIG. 8A, when the time card is inserted into the time recorder through the entry 2 and a lower end portion arrives to a position A (FIG. 3), the card sensor 11 indicates an ON state and thereby the motor 7M activates to rotate the feed roller 5. By the rotation of the feed roller 5, a time card feeding operation is commenced to feed the time card gradually. Upon advancing to a position B, the front face mark sensor 12 detects the front face mark WA and the rear face mark WB, and thereby the front face mark sensor 12 begins to read the content of the marks WA and WB, as seen in FIG. 3.

As is shown in FIG. 8C, the feeding operation is continued and front face mark sensor 12 commences reading the ID.

Figures 9A, 9B, 9C:
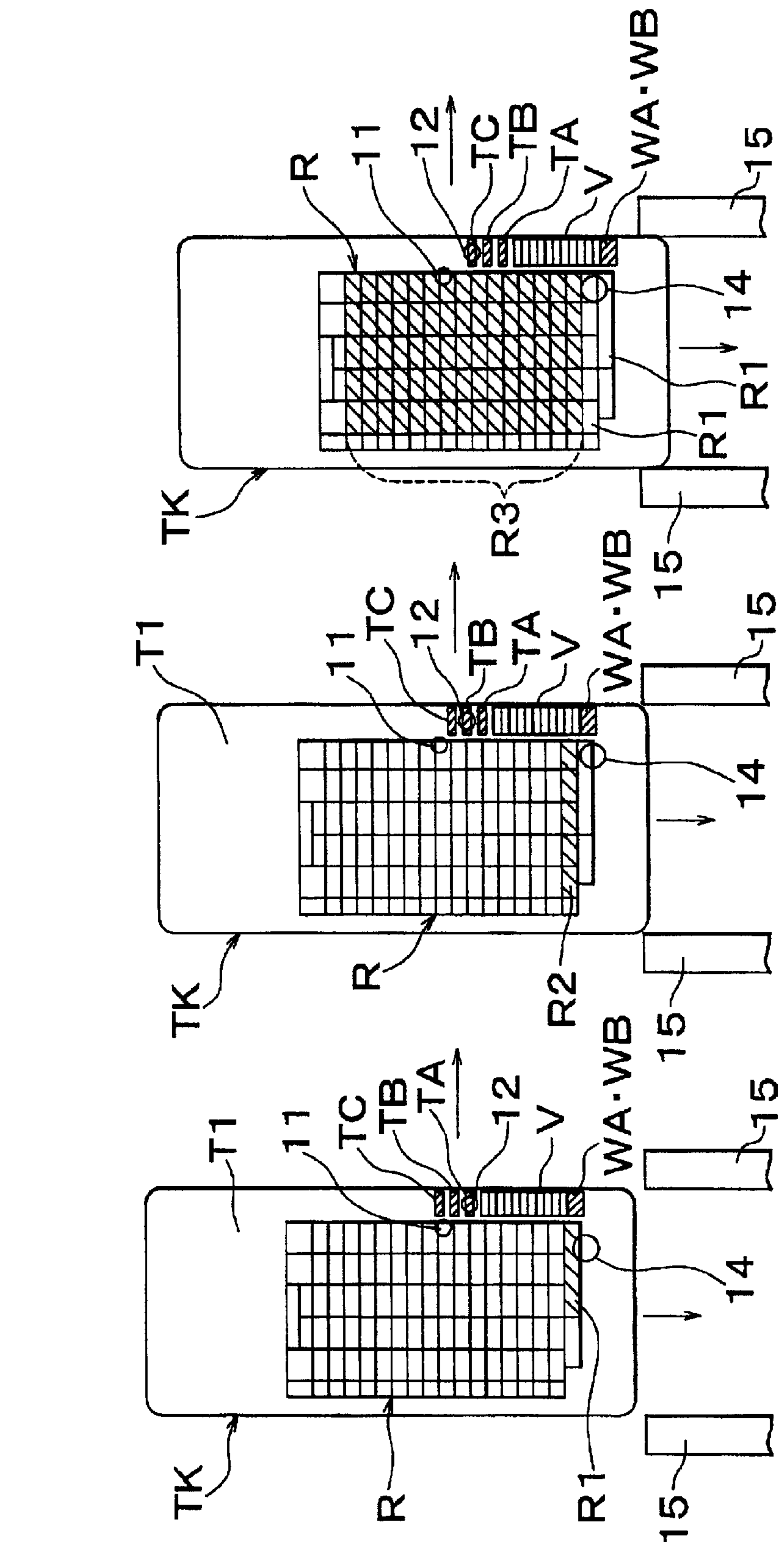
FIGS. 9A through 9C are views illustrating a card inserting operation of the time recorder system according to the present invention.

FIG. 9A illustrates the relationship between the printer head and the lower guides 15 and 15. When the time card is fed to the position D shown in FIG. 3, the front face mark sensor 12 reads the first printing column reference mark TA. As is shown in FIG. 9A, the time card is further advanced to read the first printing column position reference mark TA. The front face mark sensor 12 reads out the first printing column position reference mark TA, and the printer head 14 travels a given step and prints the employee number on the recording column shown by the oblique lines of the time card.

Furthermore, FIG. 9B shows a relationship between the time card, the printer head and the lower guides 15 and 15. When the time card is fed to the position E shown in FIG. 3, the printer head 14 also advances by a predetermined step to read the second printing column reference mark TB. As is shown in FIG. 9C, when the time card travels and thereby reaches a position F, the front face detecting sensor 12 detects the third printing column position reference mark TC and the card feeding roller 5 feeds the time card by a predetermined step, according to a pulse signal generated from the encoder sensor 9, and begins to print the working data.

FIG. 10 is a mark criterion table showing a relation between the card feeding step number and the mark position. As for the confirmation of the existence or absence of the mark, when the time card advances such as 7 steps, the existence of the mark is confirmed and when such as 21 steps two marks are confirmed. In a like manner, as for all step numbers, confirmations are performed.

Although the procession of FIGS. 8A through 8C and 9A through 9C are described concerning the relation between the front face sensor 12 and the front face of the time card, similar procession can be also performed with respect to the rear face. In this case, the procession of FIG. 9A is omitted since the rear face T2 is not provided with the employee number printing column R1.

As is shown in FIG. 11, it is possible to create a different constitution of the ID code. The indication column V of the front face T1 may have ten indication marks for the numbers 1–10 mark V and the indication column V' of the rear front face T2 may have ten indication marks for different letters and signs.

As set forth in the foregoing, the marks VN and VN' are recorded to each of the ID mark V and V' with a binary number and each of the marks VN and VN' is printed without a gap therebetween. Marks VN and VN', the card front and rear face deciding marks WA and WB, and the first, second and third printing column position reference marks TA, TB and TC are respectively formed by bar code shapes. Accordingly, the reading by the mark sensors 12 and 13 can be performed in a short time interval and accurately.

Figure 12:
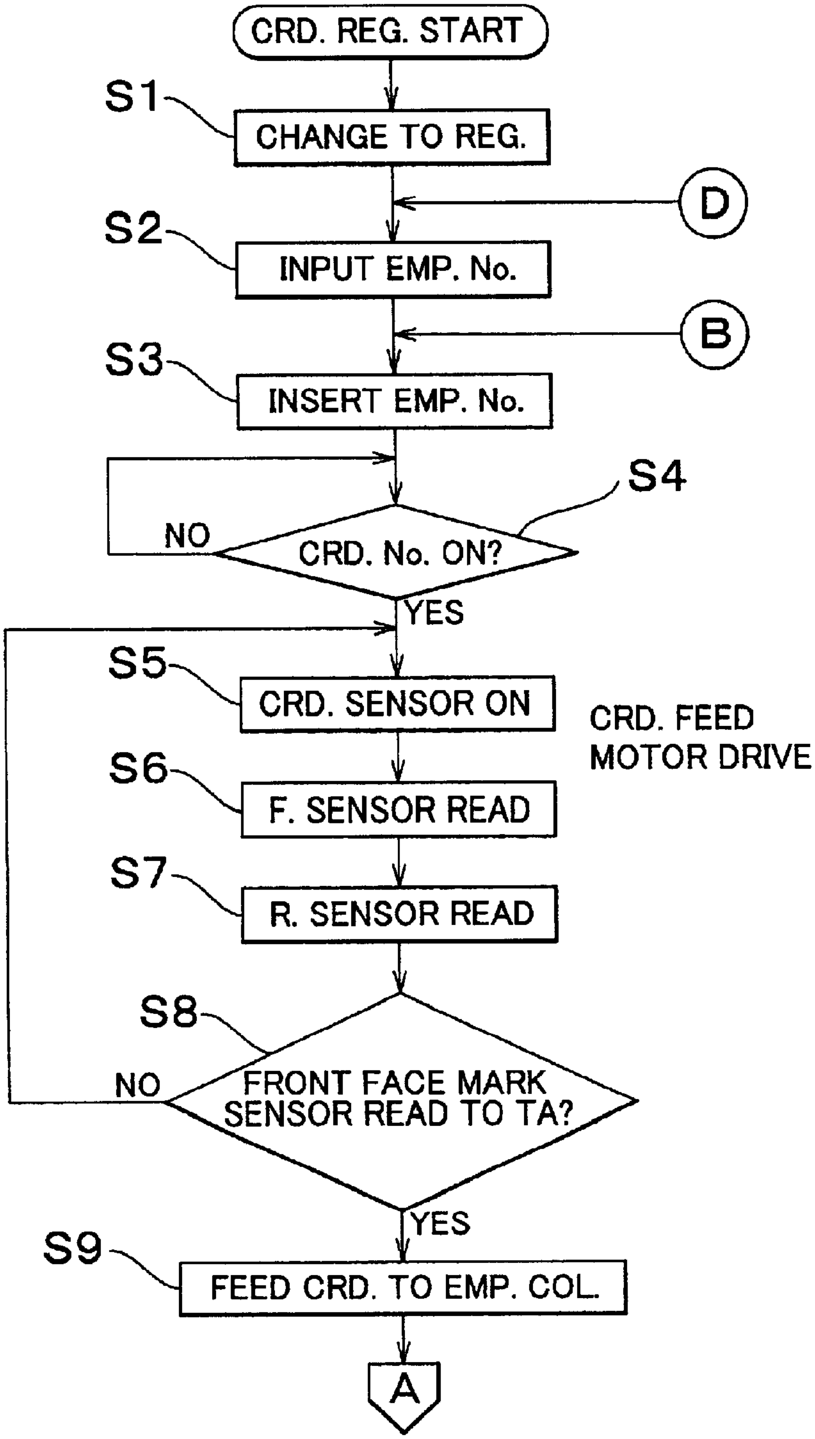
FIG. 12 is a flow chart for explaining a card registration process executed when newly formatting an unused time card by a time recorder system according to the present invention.
Figure 13:
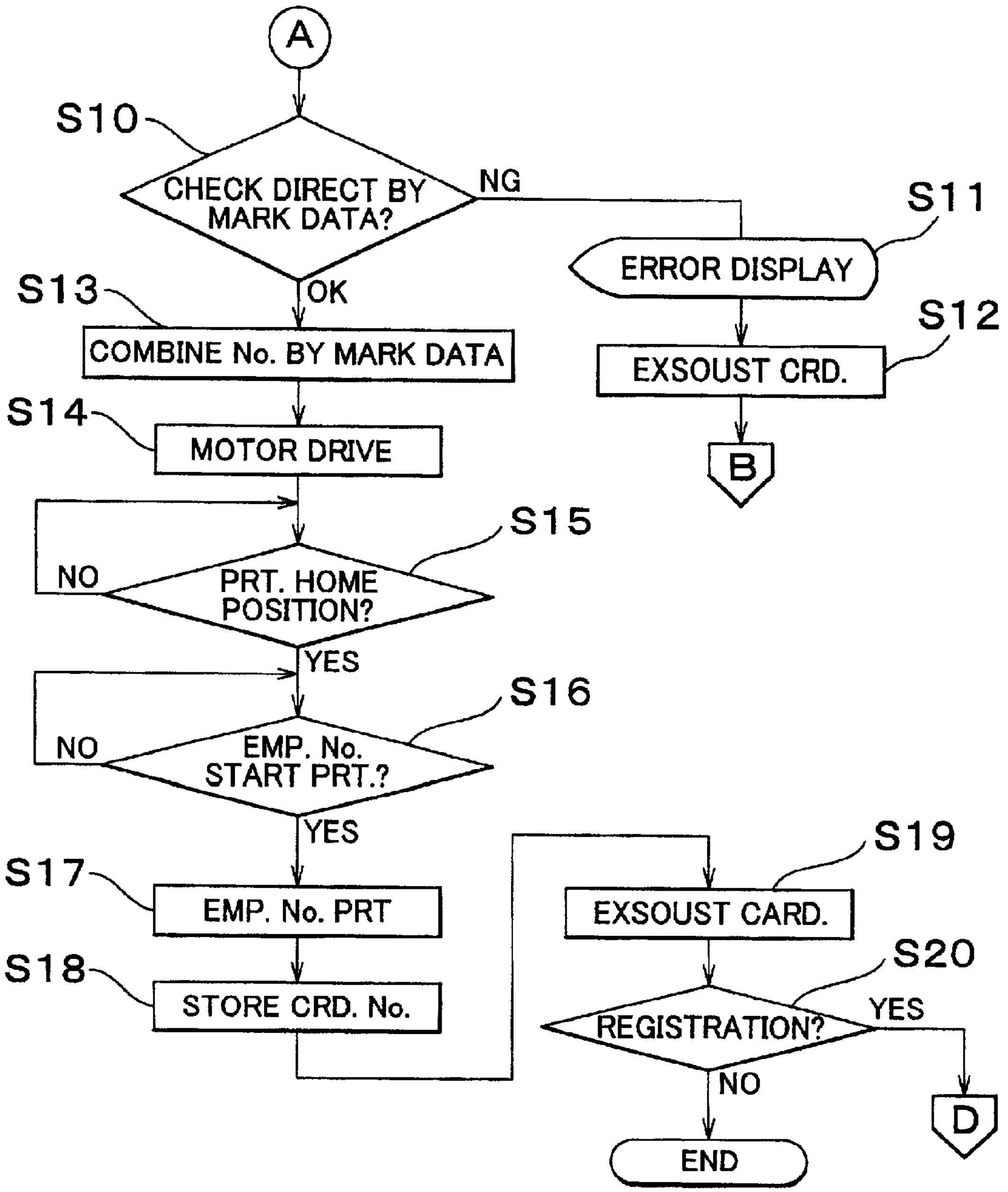
FIG. 13 is a flow chart for further explaining a card registration process executed when newly formatting an unused time card by a time recorder system according to the present invention.

Referring to FIGS. 12 and 13, there is shown a card registration process that is executed when formatting a new or unused time card with the time recorder. As is shown in FIG. 12, in step S1, a control unit of the time recorder is changed over to a card registration mode by placing a registration setting card into the time recorder TR and having it read the card. In step S2, a personal employee number to be registered is inputted through the inputting device 3 to the memory 21 by way of the interface 23 and the bus 22. Thereafter, an unused time card TK is inserted into the time recorder TR in step S3. Then, CPU 20 decides whether a card detecting sensor 11 is in an ON state or not, in step S4. When the card detecting sensor 11 is in an ON state, a card feeding motor 7M is driven to feed the time card TK in step S5. In step S6, a front face detecting sensor 12 commences to read the card mark, and a rear face detecting sensor 13 begins to read the card mark, in step S7.

Next the procedure advances to step S8 and the CPU 20 determines whether the front face mark sensor 12 has read from the rear face deciding mark WB to a first printing column reference mark TA. When the marks are read, the time card TK is fed to the employee number printing column R1 in step S9. In step S8, if the front face mark 12 was not read, the procedure returns to step S5 to repeat the operations from step S5 to step S8.

After the procedure of step S9 is executed, as seen in FIG. 13, a direction of the time card TK is checked by the front or rear mark data read by the sensors 12 or 13 in step S10. When the direction is rear face, an error display is performed in step S11, and the time card TK is pushed out of the time recorder TR. Thereafter, the procedure returns to step S3 shown in FIG. 12. In step S10, when the direction of the time card is front face, the employee number is combined with front face data and rear face data, in step S13. Thereafter, in step S14, a dot printer 14 is driven to drive a printer head. By driving the dot printer 14, the home position of the printer head of the dot printer 14 is checked by the home position sensor 14S to determine whether the printer head is located at the home position or not, in step 15S.

When the home position sensor 14S is located at the home position, the printer head is checked to determine whether it is at the employee number print starting position or not, in step S16. When the position is confirmed, the employee number is printed to the employee number printing column R1 in step S17, and the card number to be used by the person is stored in the memory 21 in step S18. Thereafter the time card TK is pushed out of the time recorder in step S19. In step S20, the CPU checks whether the next personal registration is to be performed or not. When the next registration is not necessary, the registration is ended. If the next registration is necessary, the procedure advances to step S2 shown in FIG. 12 and steps S2 through S20 are repeated.

Figure 14:
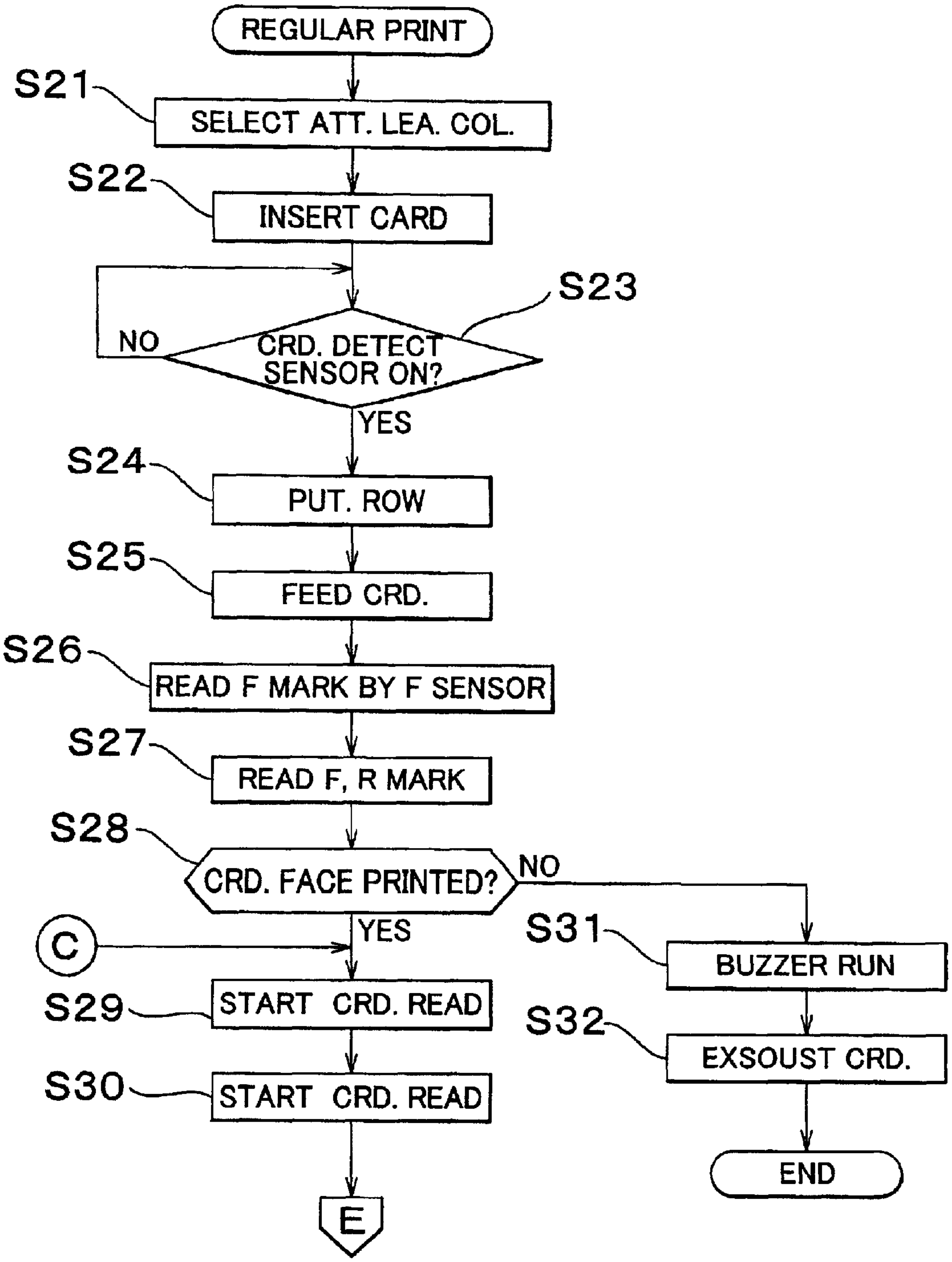
FIG. 14 is a flow chart for explaining a regular printing operation by a time recorder system according to the present invention.
Figure 15:
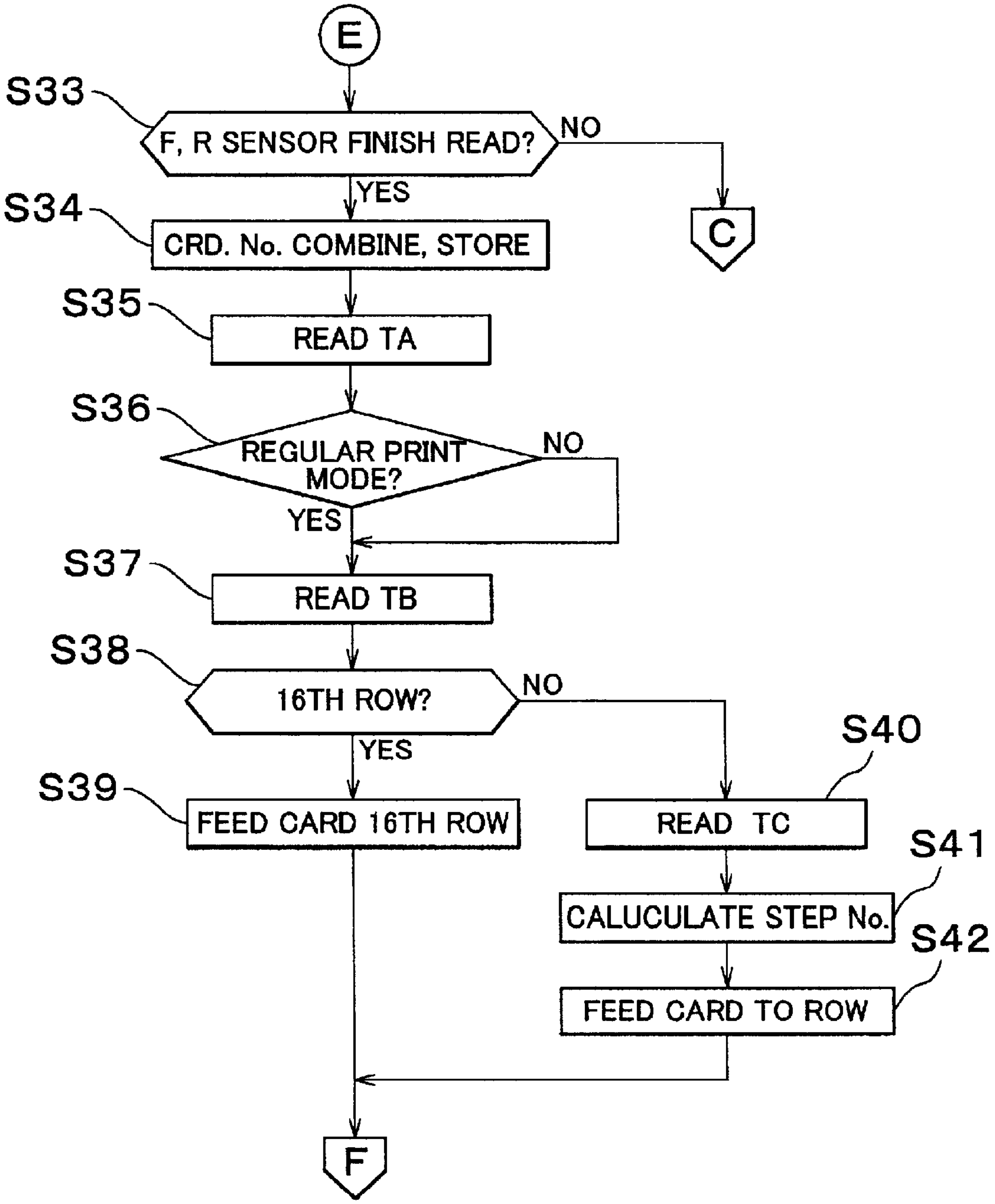
FIG. 15 is a flow chart for further explaining a regular printing operation by a time recorder system according to the present invention.
Figure 16:
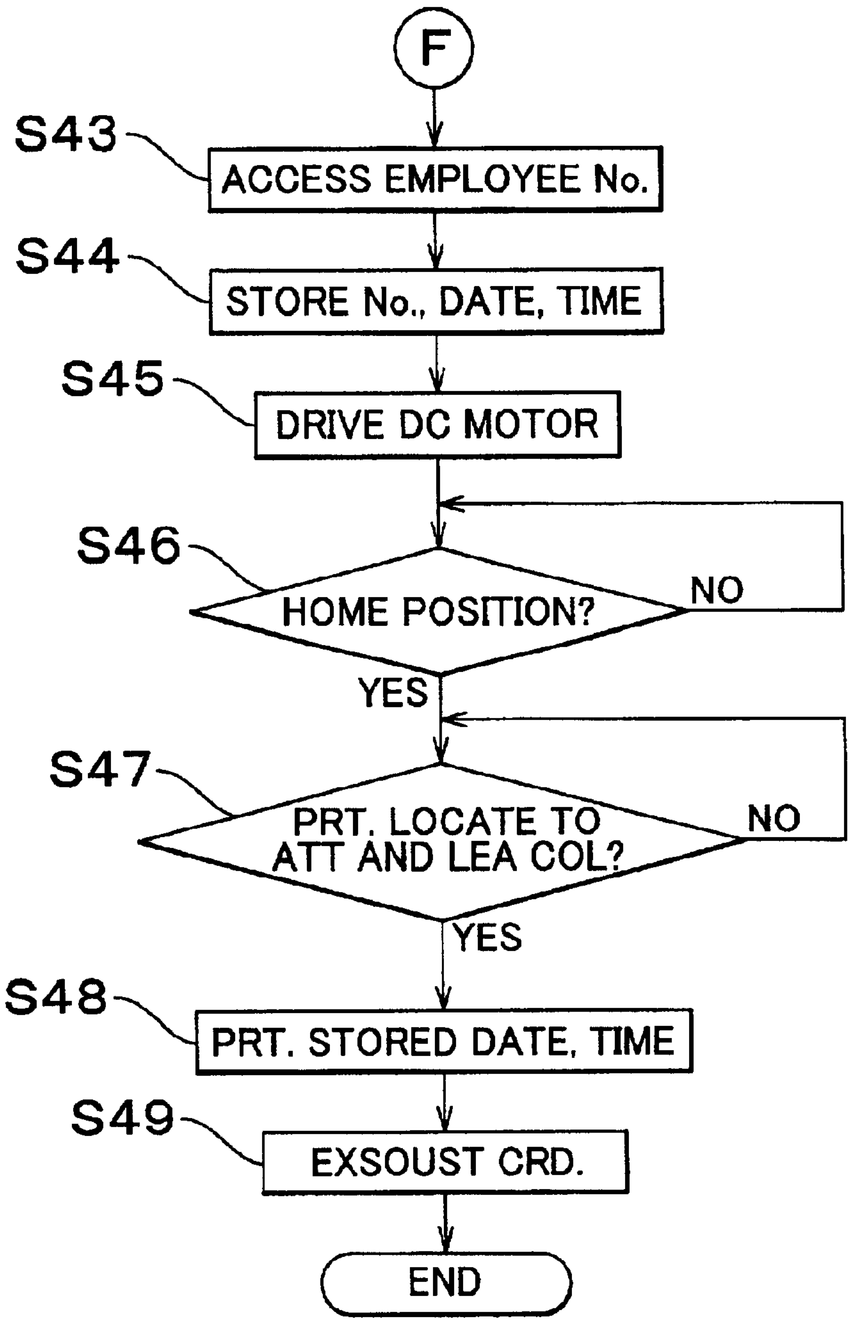
FIG. 16 is a flow chart for further explaining a regular printing operation by a time recorder system according to the present invention.
Figure 17:
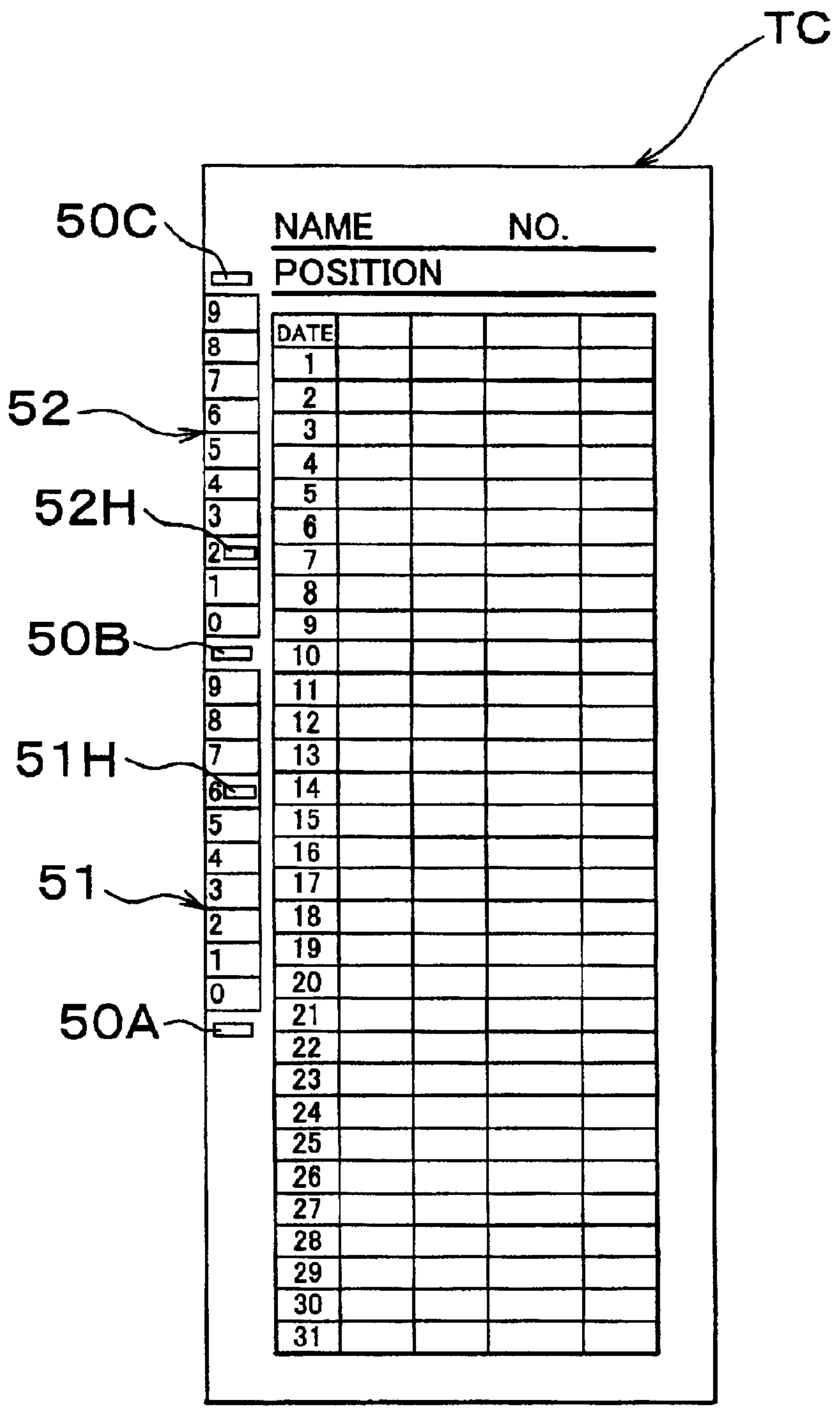
FIG. 17 PRIOR ART
FIG. 17 is a block diagram of time card employed by a prior art time recorder system.

FIGS. 14 through 16 are flow charts for the regular printing operation employing the above described registered time card.

As is shown in FIG. 14, the CPU 20 selects the working data printing column of the registered time card in step S21. When the time card TK is inserted to the entry 2 of the time recorder TR in step S22, the CPU 20 checks whether the card detecting sensor 11 is in an ON state or not in step S23. When the card detecting sensor 11 is activated, the printing face is set to the printing column by calculating the printing row using an internal clock in step S24. After setting of the printing face, the time card is fed into the time recorder in step S25, and the front face mark or the rear face mark is read by front face mark sensor 12, in step S26.

Further, the rear mark sensor 13 reads the front face mark or the rear face mark in step S27, and the procedure advances to step S28 to check whether the face of the inserted card is to be printed or not. If the face is not to be printed, a buzzer alarm is sounded in step S31, and the card is pushed out of the time recorder to finish the procedure. When the face of the inserted card is to be printed in step S28, the front face mark sensor 12 begins to read the number of the time card in step S29. And, in step S30, the rear face detecting sensor 13 begins to read the number of the time card.

As seen in FIG. 15, in step S33, the CPU 20 judges whether the front and rear face mark sensors 12, 13 have finished reading the card number. If both sensors have not finished reading, the procedure advances to step S29 shown in FIG. 14 and steps S29, S30, and S33 are repeated. When both sensors finish reading, the CPU 20 combines the front and rear face card numbers S34 and rear face mark sensor 13 reads S35 the fist printing column position reference marks TA. In step S36, the CPU 20 judges whether the time recorder TR is in a regular printing mode or not.

In step S37, sensors 12 and 13 read up to the printing column position reference mark TB. In step S38, the CPU 20 decides whether the calculated printing row is a 16th row or not. When the calculated printing row is the sixteenth row, the time card TK is fed to the 16th row based on the reading of the second printing column reference mark TB and advances to step S43 of FIG. 16. If it is not the sixteenth row in step S38, step S40 is executed to read the printing position reference mark TC. In step S41, the CPU 20 calculates the step number up to the row corresponding to the date to be printed within the first through fifteenth rows of the card.

Thereafter, the process is advanced to step S42 to feed the card to the third printing position reference code mark TC. Here, the time card TK is printed based on the third printing column position reference mark TC read by the front face mark sensor 12.

As seen in the flowchart of FIG. 16, the CPU 20 accesses the combined employee number of the user who uses the time card in step S43. And then, the CPU 20 stores the accessed employee number, attendance or leaving data, the current date and the current time to the memory 21 to advance to step S45. The card feeding motor 7M in the form of a DC motor for the dot printer 14 is driven in step S45. In step S46, the CPU 20 decides whether the printer head 14S of the dot printer 14 travels to the home position or not. When the printer head is located at the home position, the process advances to step S47 and the CPU 20 judges whether the printer head is located at the selected attendance or leaving column or not. When the printer head 14S is located at the selected position, the dot printer 14 prints the date and the time stored in the memory 21, and in step S49 the time card TK is pushed from the time recorder TR to finish the regular printing operation.

The important features of the present invention is mentioned in the following items (1) to (5)

(1) As is shown in FIG. 12, in registering a new and unused time card, a control unit of the time recorder is changed over to the card registration mode in step S1. In step S2, a personal employee number to be registered is inputted by an inputting device 3 to a memory 21, and thereafter the unused card is inserted to the time recorder in step S3.

(2) As is shown in FIG. 13, each of the procedures from steps S4 to S13 is executed in order to combine the employee numbers of ID marks VN and VN'. The combined employee number is printed to the employee number printing column R1 in step S17, and is stored on the memory 21 in step S18. Thereafter, the registration operation is ended after the procedure of steps S19 and S20.

(3) As is shown in FIG. 14, out of the procedures executed in steps S21 though S49, a first mark sensor such as the front face mark sensor 12 begins to read the number of the card, in step S29. And a second sensor such as the rear face sensor 13 begins to read the number of the card instep S30.

(4) As seen in FIG. 15, when both sensors finish reading, the CPU 20 combines the front face card number and the rear face card number and stores the combined number to the memory 21, to enable combining the card numbers (ID codes) in step S34.

(5) As is shown in FIG. 16, the CPU 20 accesses the employee number of the user who employs the card from the combined number obtained in step S43. And then, the CPU 20 stores the accessed employee number, attendance or leaving data, the current date and the current time from the memory 21 in step S44. In step S48, the printer 14 prints the date and the time stored in the memory 21.

According to the present invention, the time card and the time recorder system are constructed such that an ID is divided into a plurality of portions and the divided IDs are simultaneously read by combining these divided IDs, in order to finish the ID reading operation in a preferably short time interval. Further, the time recorder system of the present invention reads the ID of the time card and stores the attendance and leaving data to the memory as well as prints the data while the card travels toward the bottom portion of the time card recorder. Accordingly, the time interval required in one printing operation is extremely shortened and the size of the time recorder is miniaturized by reducing the height of the time recorder, in comparison with the prior art time recorder system in which the ID is read in the inserting operation of the time card to the lowermost portion of the time recorder and thereafter attendance and leaving data are printed in the feeding back operation to the entry of the time recorder.

It is to be understood that changes and modifications to the form of the invention set forth in the disclosure by way of illustration may be made by those skilled in the art without departing from the spirit of the invention as defined in the clams which follow.

What is claimed is:

1. A time card comprising:

first and second card identifying sections disposed on opposite faces of the time card, the first card identifying section stores a most significant value of an identification of the time card and the second card identifying section stores a least significant value of the card's identification, and when combined to form a single value, the most and least significant values provide the time card identification; and a printing position indicator that identifies an initial printing position for the first and second card identifying sections to a time card recorder.

2. The time card of claim 1, further comprising:

a direction indicator that identifies a printing direction of the time card; and first and second card face indicators disposed on opposite sides of the time card, each of the first and second card face indicators comprising a front face indicator section and a rear face indicator section, wherein the combined data provided in the front and rear face indicator sections of each of the first and second card face indicators identifies the corresponding face as either the front or rear face of the time card.

3. The time card of claim 1, further comprising first and second significance indicators disposed on opposite faces of the time card, wherein the first significance indicator indicates that the first card identifying section stores the most significant value of the time card identification and the second significance indicator indicates that the second card identifying section stores the least significant value of the time card identification.

4. The time card of claim 1, wherein the first and second card identifying sections are disposed in mirror image positions on the opposing faces of the time card.

5. The time card of claim 1, wherein the most and least significant values are stored to the first and second card identifying section, respectively, using a bar code that extends along a direction in which the card is inserted into the card recorder.

6. The time card of claim 1 further comprising:

a first reference mark that identifies, for the card recorder, a printing position of an employee number to be stored on the time card;

a second reference mark that identifies, for the card recorder, a printing position of work data to be stored on the time card; and a third reference mark that identifies, for the card recorder, a printing position of a data printing row of the time card.

7. A time card recorder comprising:

a reading means for reading, during a single insertion of a time card, first and second card identifying sections disposed on opposite faces of the time card, the reading means reading a most significant value provided in the first card identifying section and reading a least significant value provided in the second card identifying section;

an identification means for determining an identification of the time card by combining the most and least significant values to form a single value that identifies the time card.

8. The time card recorder of claim 7, wherein the reading means reads the first and second card identifying sections substantially simultaneously.

9. The time card recorder of claim 7, further comprising:

a printer for printing information on the time card for storage thereon, wherein the reading means reads the first and second card identifying sections and the printer prints the information as the time card travels in the insertion direction of the time card.

* * * * *